April 2, 1935. M. E. MUTCHLER 1,996,211
INTERNAL COMBUSTION ENGINE
Filed Sept. 27, 1932 10 Sheets-Sheet 1

INVENTOR
Maurice E. Mutchler
BY Popp and Powers
ATTORNEYS

Fig. 3.

April 2, 1935.　　　M. E. MUTCHLER　　　1,996,211
INTERNAL COMBUSTION ENGINE
Filed Sept. 27, 1932　　10 Sheets-Sheet 3

INVENTOR
Maurice E. Mutchler
BY Popp and Powers
ATTORNEYS

April 2, 1935.   M. E. MUTCHLER   1,996,211
INTERNAL COMBUSTION ENGINE
Filed Sept. 27, 1932   10 Sheets-Sheet 4

INVENTOR
Maurice E. Mutchler
BY Popp and Powers
ATTORNEYS

April 2, 1935.  M. E. MUTCHLER  1,996,211
INTERNAL COMBUSTION ENGINE
Filed Sept. 27, 1932   10 Sheets-Sheet 5

INVENTOR
Maurice E. Mutchler
BY Popp and Powers
ATTORNEYS April 2, 1935.  M. E. MUTCHLER  1,996,211
INTERNAL COMBUSTION ENGINE
Filed Sept. 27, 1932   10 Sheets-Sheet 6

April 2, 1935.  M. E. MUTCHLER  1,996,211
INTERNAL COMBUSTION ENGINE
Filed Sept. 27, 1932   10 Sheets-Sheet 8

INVENTOR
Maurice E. Mutchler
BY Popp and Powers
ATTORNEYS

April 2, 1935. M. E. MUTCHLER 1,996,211
INTERNAL COMBUSTION ENGINE
Filed Sept. 27, 1932  10 Sheets-Sheet 9

INVENTOR
Maurice E. Mutchler
BY Popp and Powers
ATTORNEYS

April 2, 1935.  M. E. MUTCHLER  1,996,211
INTERNAL COMBUSTION ENGINE
Filed Sept. 27, 1932  10 Sheets-Sheet 10

INVENTOR
Maurice E. Mutchler
BY Popp and Powers
ATTORNEYS

Patented Apr. 2, 1935

1,996,211

UNITED STATES PATENT OFFICE 1,996,211

INTERNAL COMBUSTION ENGINE

Maurice E. Mutchler, Buffalo, N. Y.

Application September 27, 1932, Serial No. 635,036

28 Claims. (Cl. 123—195)

This invention relates to internal combustion engines and more particularly the invention is concerned with improvements in casings therefor of the sheet metal type. The invention contemplates the production of the casings from preformed sheet metal sections, each of which includes integral cylinder and crank case portions.

One object of the invention is to incorporate in a preformed section the casing, including cylinder and crank case portions, of a single cylinder engine, whereby as many of the sections may be assembled as will provide the casing of an engine having the desired number of cylinders.

A further object is to provide a construction, which while light, is extremely rigid, this object contemplating a direct connection between the head and main bearings of the engine whereby the forces acting against such parts are dissipated by said connection.

A still further object is a novel design and arrangement of the parts of the casing whereby simplicity in construction is obtained.

The invention is illustrated in the accompanying drawings, in which.

Figure 1:
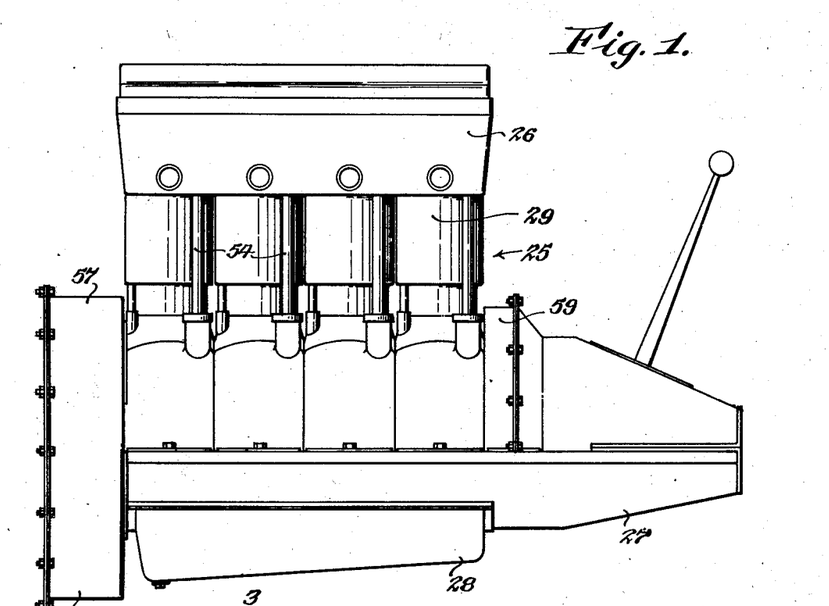
Figure 1 is a side elevation of an engine embodying features of the invention.
Figure 2:
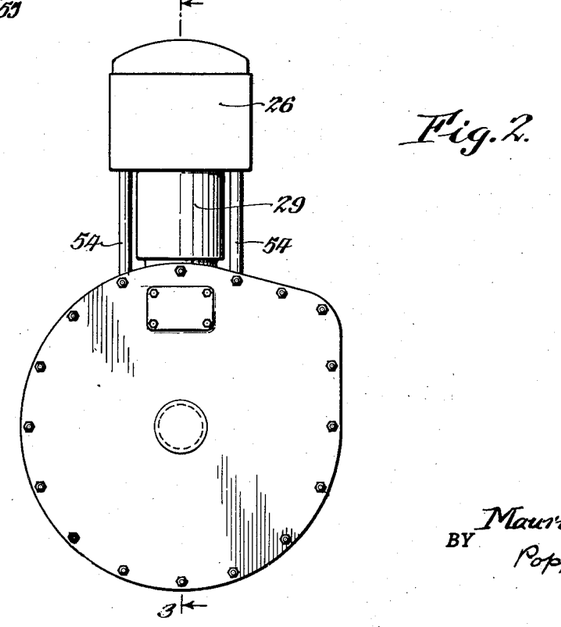
Figure 2 is a front elevation thereof.

The invention is illustrated in Figure 1 in connection with an engine having a casing 25 and a head 26 therefor, the said casing including an oil pan 27 and a sump 28 carried thereby. The casing 25 is made up of a plurality of sections 29 of shell-like construction. Each section 29 (Figure 14) includes cylinder and crank case portions 30 and 31 respectively. The latter is formed with parallel flat side walls 32 and tapered connecting end walls 33. The crank case portion 31 of the shell is connected by a flared wall 34 to the cylinder portion 30 of the shell. The latter is formed with an annular enlargement 35 and a neck 36. The cylinder wall of the section is preferably provided by a sleeve 30a (Figure 3) which fits snugly in the cylinder portion 30 of the section, the said sleeve, as illustrated, extending from the neck 36 of the section past the annular enlargement 35 thereof into the crank case portion 31. The sleeve 30a co-operates with the enlargement 35 of the section to provide a chamber 35a through which a cooling medium may be circulated, pipe connections 30b (Figure 4) being carried by the enlargement and communicating with the chamber 35a for this purpose. It is understood of course that the sleeve 30a may be secured in the section in any suitable manner. Welding is preferable for the reason that the chamber 35a can be readily sealed when the sleeve is secured in this manner. It will be apparent that each section comprises an independent unit providing the casing, including cylinder and crank case portions, of a single cylinder.

Figure 3:
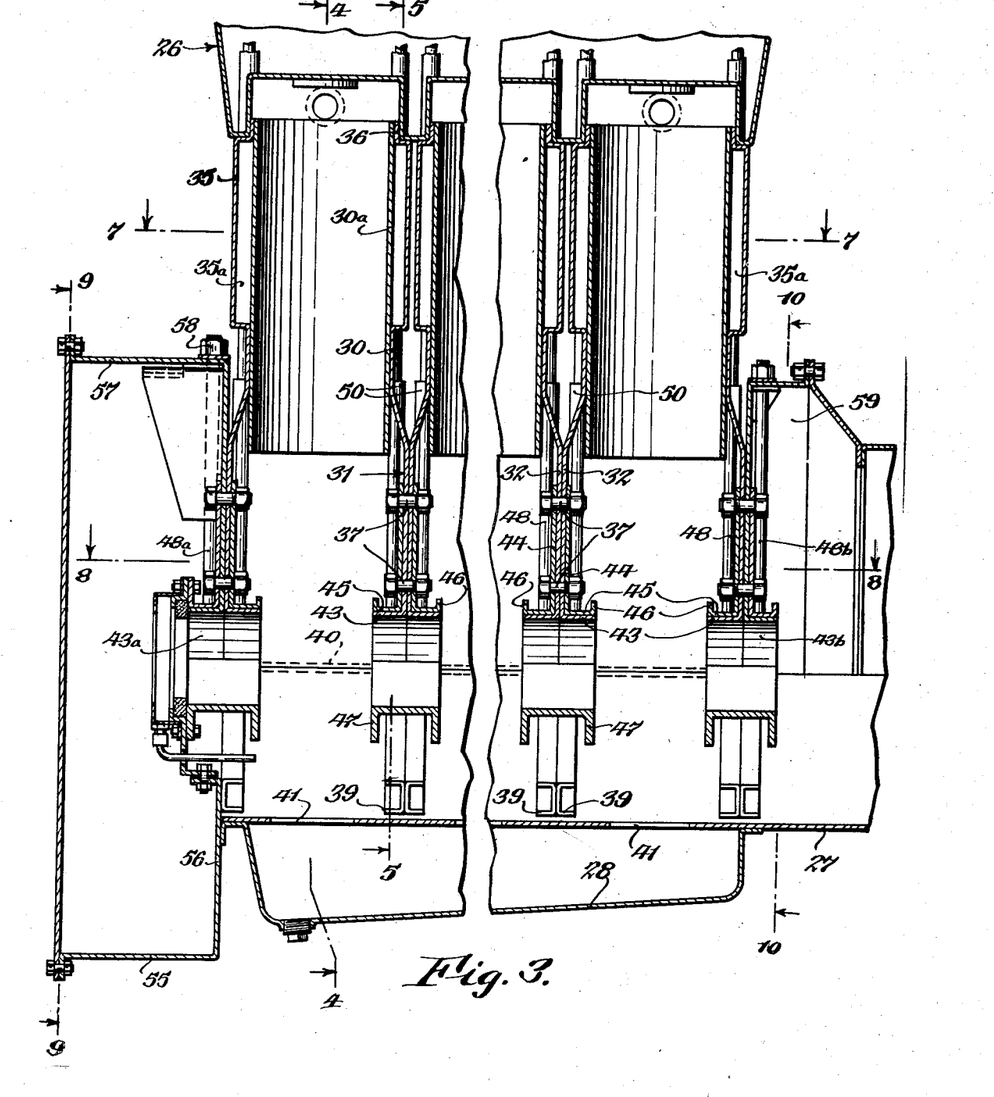
Figure 3 is a longitudinal vertical section through the engine.

The engine casing, therefore, is formed by assembling a plurality of the sections 29, the number of such sections corresponding to the number of cylinders desired. As best shown in Figure 3 the sections are arranged side by side with the flat side walls 32 of the crank case portions of the sections being arranged in abutting relation. The said sections may be secured together in any suitable manner. As shown, this is accomplished by nut and bolt fastenings 37, the side walls 32 of the crank case portions of the sections being formed with aligned openings 38 through which the bolts of said fastenings pass. It will be apparent that in the casing thus provided the tapered end walls 33 of the sections co-operate to provide the side walls of the crank case while the abutting pairs of side walls 32 of the crank case portions of the sections provide partitions which extend transversely of the crank case.

The margins of the bottoms of the side walls 32 of the crank case portions are preferably flanged as at 39 while the tapered end walls 33 of the said portions are preferably formed with flanges 40. The oil pan 27 is secured to the casing by means of flanges 39 and 40 and suitable fastening means. The oil pan 27 is suitably apertured at spaced intervals as at 41 (Figure 3) to permit the passage of lubricant from the crank case to the sump. It will be apparent that the partitions provided by the side walls 32 of the casing sections and the oil pan cooperate to provide a rigid construction.

The side walls 32 of the sections are availed of to carry the crank shaft of the engine. To this end the said walls are cut away as at 42 to accommodate the crank shaft. In the formation of the openings 42 the side walls 32 of the sections are provided with flanges 43. The flanges 43 are so formed that when the sections are assembled the flanges of adjacent sections co-operate to provide bearings, it being understood that the wearing surfaces of the said bearings may be provided by suitable bushings or babbit metal in the usual manner. In order to strengthen the bearings thus provided reinforcing elements 44 are secured by the nut and bolt fastenings 37 against the inner sides of the walls 32. The reinforcing elements are formed with flanges 45 which fit conformably about the flanges 43, the flanges 45 preferably being flared as at 46.

Figures 4, 5, 6:
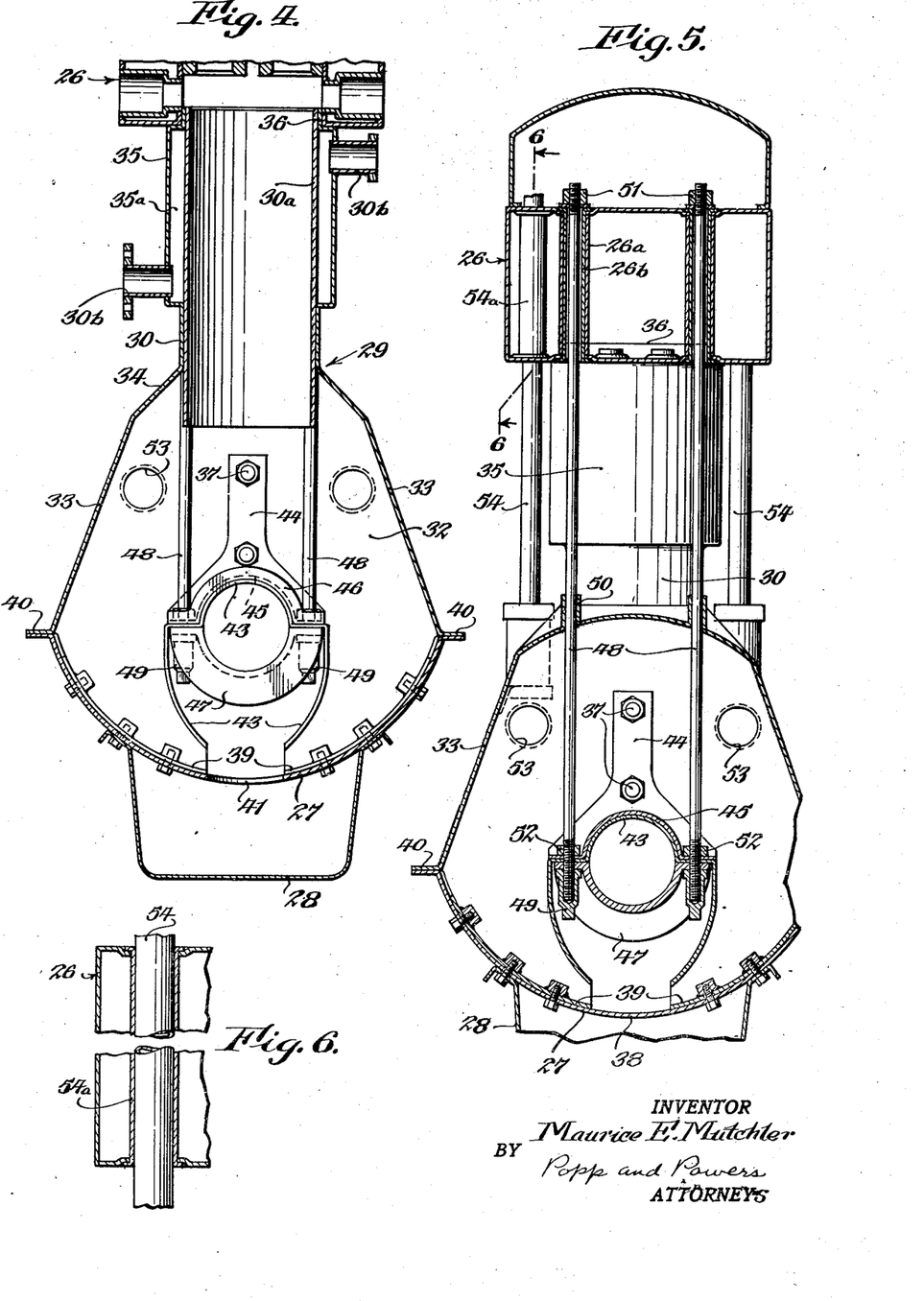
Figure 4 is a section taken along line 4—4 of Figure 3.
Figure 5 is a similar section taken along line 5—5 of Figure 3.
Figure 6 is an enlarged fragmentary section taken along line 6—6 of Figure 5.
Figure 7:
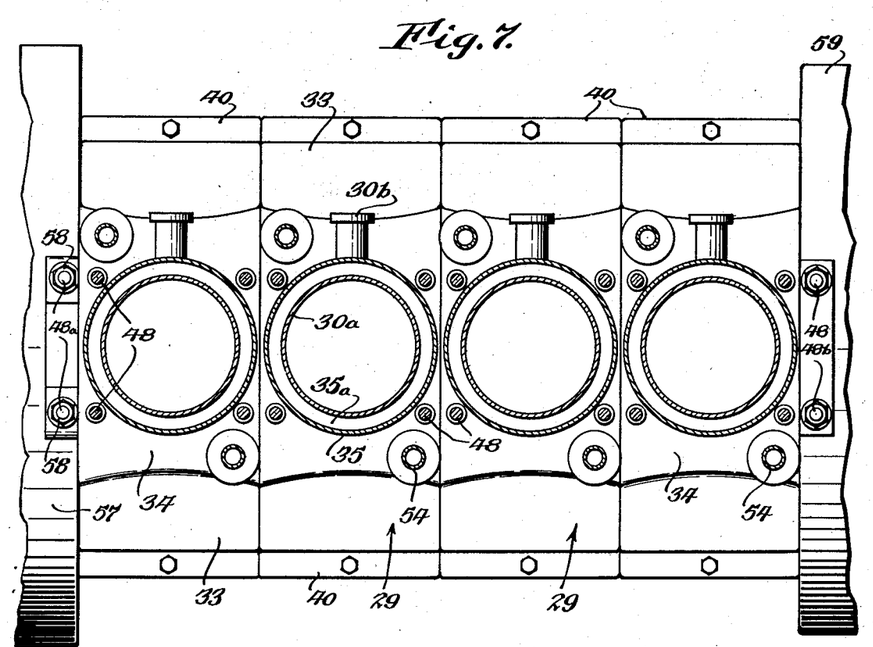
Figure 7 is a horizontal sectional view taken along line 7—7 of Figure 3.
Figure 8:
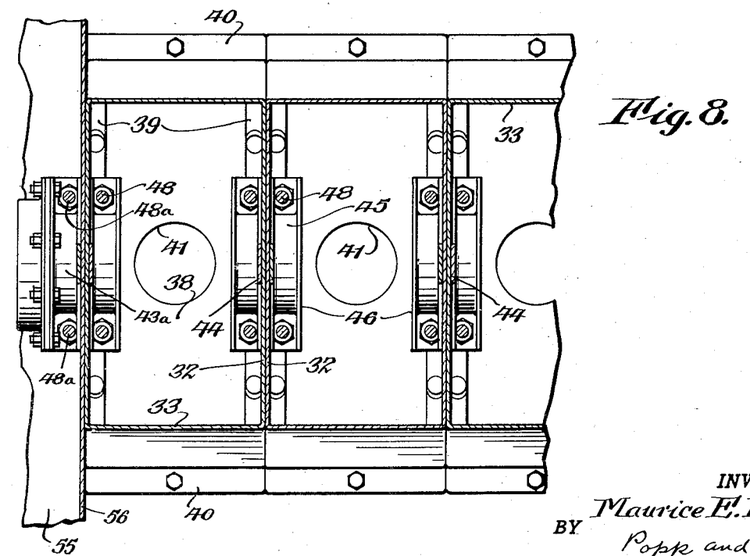
Figure 8 is a similar view taken along line 8—8 of Figure 3.
Figure 9:
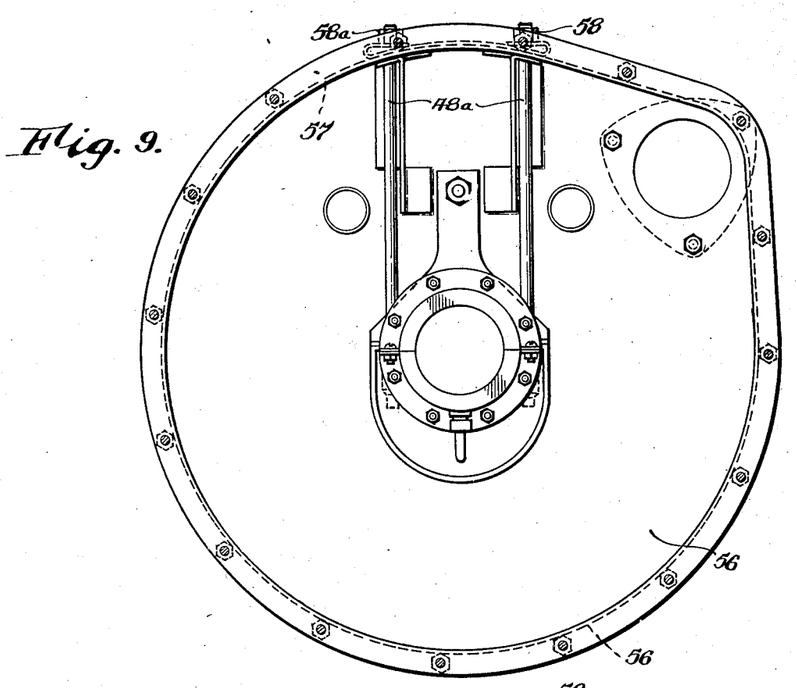
Figure 9 is a section through the fly wheel housing taken along line 9—9 of Figure 3.
Figure 10:
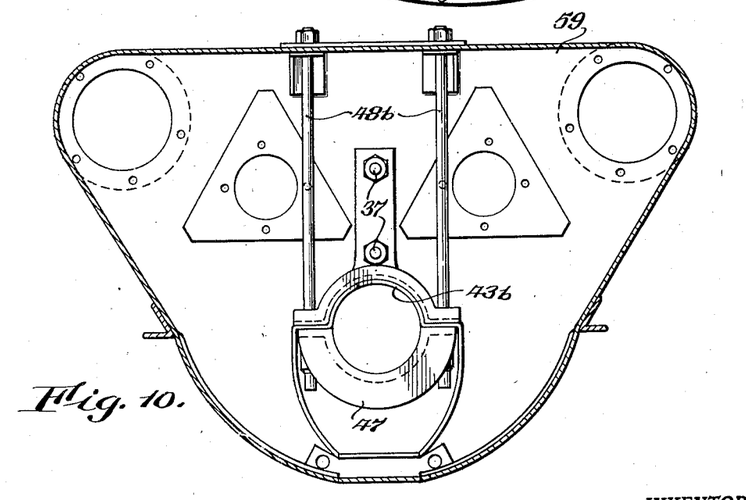
Figure 10 is a section through the timing gear housing and is taken along line 10—10 of Figure 3.

Suitable bearing caps 47 are employed in connection with the bearings provided by the flanges 43. The said caps fit over the threaded ends of tie rods 48 (Figure 5) and are secured thereon by nuts 49. There are a pair of such tie rods employed in connection with each of the two bearing sections. In other words there are four tie rods 48, a pair of rods being arranged at each side of the composite partition provided by the abutting side walls 32 of adjacent sections (Figures 5 and 8). The said rods extend upwardly through flanged openings 50 of the sections between the annular enlargements 35 of adjacent sections and pass through openings provided for this purpose in the head 26. The latter may be of any suitable construction. As shown it is sheet metal in construction and is formed to fit over the neck portions 36 of the sections. Owing to its sheet metal construction the head 26 is preferably reinforced by sleeves 26a and 26b. The rod 48 fits loosely within the former which has its ends swaged over the top and bottom walls of the head while the latter fits snugly about the sleeve 26a with its ends terminating in abutting relation with the said top and bottom walls. The construction of the head is not material and hence this general description is adequate for the purpose in view. It is understood, of course, that the invention contemplates the use of cast as well as sheet metal heads in connection with the casing. The rods 48 extend above the head 26 and are suitably threaded at their ends to receive nuts 51. The rods 48 preferably carry nuts 52 which co-operate with the nuts 49 in securing the bearing caps 47 in position. From the foregoing it will be apparent that the construction described has the advantage that the forces acting against the crank shaft and the head of the engine are caused to counteract one another, the tie rods 48 taking up all of such forces. The engine casing, therefore, despite its sheet metal construction is extremely rigid. The arrangement described has the further advantage that either the head 26 or the bearing caps 47 may be removed with facility as occasion may require.

Aligned openings 53 (Figures 4 and 5) are, as illustrated, formed in the side walls 32 of the crank case portions of the sections to accommodate suitable cam shafts (not shown) and the said sections carry suitable sleeves 54 which extend from the crank case through the head 26. The said sleeves are adapted to house the push rods for the valves. They pass through tubular members 54a (Figure 6) which are carried by the head. At its front end the casing includes a fly wheel housing 55. The rear wall 56 (Figure 3) of the housing is secured against the outer face of the side wall 32 of the foremost section. The wall 56 of the housing is formed with a flange 43a which co-operates in the manner described with the corresponding flange 43 carried by the foremost section to provide the front bearing of the engine. A reinforcing element similar to the elements 44 is carried by the rear wall 56 of the housing. The said wall, therefore, provides a closure for the end of the casing while at the same time co-operating with the foremost section to provide a bearing support for the crank shaft. A pair of tie rods 48a are employed in connection with the flange 43a. The said rods extend through and terminate just above the top wall 57 of the fly wheel housing. They are threaded at their upper ends to receive nuts 58 and are connected to the front bearing in the manner described in connection with the rods 48. At the opposite end the casing 25 carries a timing gear cover 59. The said cover is formed to provide a bearing section 43b which co-operates with the flange 43 of the rearmost section to provide the rearmost main bearing. Tie rods 48b are carried by the said cover and they function in the same manner as the rods 48a described in connection with the fly wheel housing. It will be apparent, therefore, that each of the intermediate main bearings is connected directly with the head of the engine by four tie rods while in the case of the end main bearings two of the tie rods are connected directly to the head of the engine while the remaining two tie rods are connected to an adjacent casing of an associated part of the engine.

Figure 11:
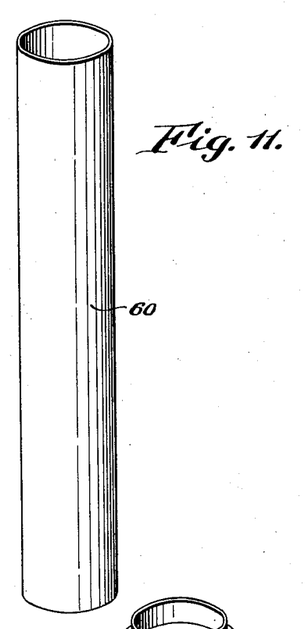
Figure 11 is a perspective view of a blank from which the casing sections are formed.
Figure 12:
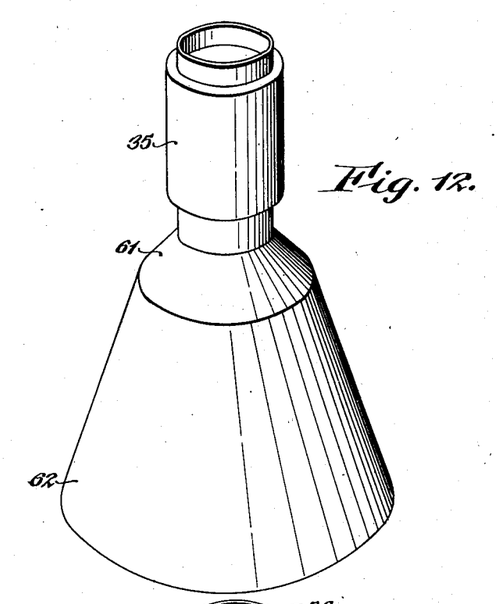
Figure 12 is a perspective view of the blank at one stage of its development.
Figure 13:
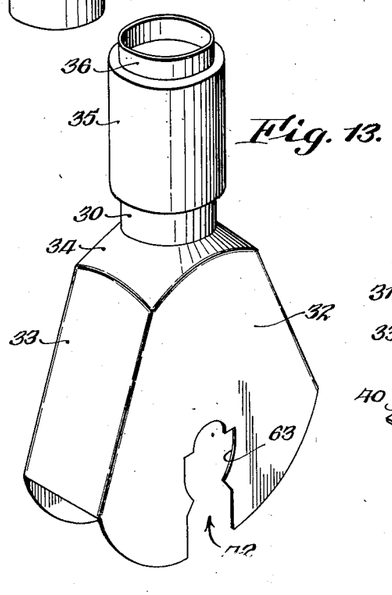
Figure 13 is a perspective view of the blank at a further stage of development.
Figure 14:
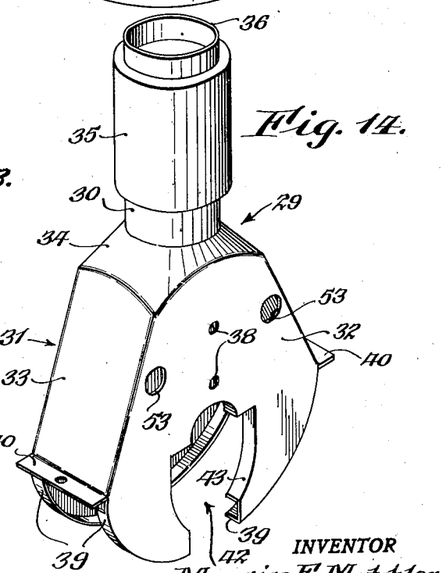
Figure 14 is a perspective view of the section in its final form.

The sections 29 of the casing are preferably formed from tubular blanks 60 (Figure 11). The annular enlargement 35 may be conveniently formed by a spinning operation. Such an operation may also be utilized to form the blank with flared portions 61 and 62 (Figure 12) which portions will eventually constitute the crank case portion of the section. By the use of suitable dies the flared portion 62 may be shaped to provide the parallel side walls 32 and connecting tapered end walls 33 (Figure 13) of the crank case portion of the section, whereby the crank case portion is provided with a cross section which is substantially rectangular. Upon the completion of the shaping operations the side walls 32 of the section are cut away as at 63 to remove the excess metal while at the same time allowing sufficient metal to provide the flanges 43 (Figure 14). It will be apparent from the foregoing that the casing 29 can be economically produced from plain tubular blanks, the sections during their formation being shaped to provide integral cylinder and crank case portions of predetermined cross-sectional areas. It is understood, of course, that the casing sections may be formed in any manner desired, the method herein described being by way of example only.

Figure 15:
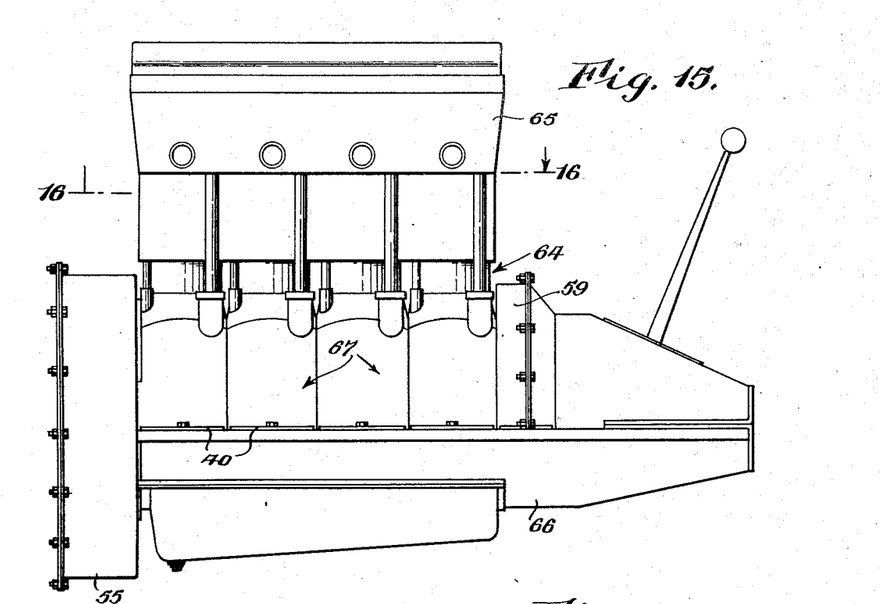
Figure 15 is a view similar to Figure 1 of another embodiment of the invention in which a modified form of section is utilized.
Figure 16:
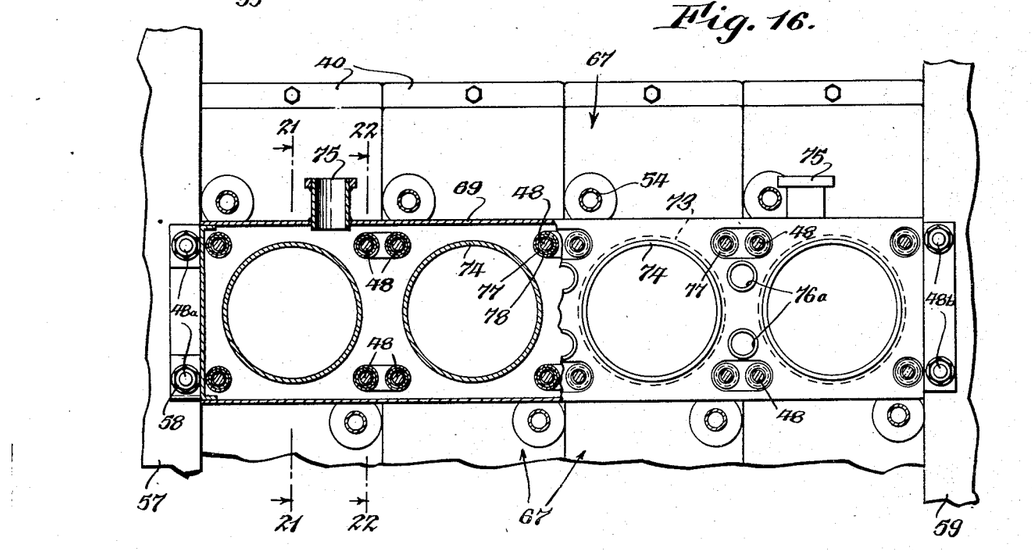
Figure 16 is a horizontal sectional view taken along line 16—16 of Figure 15.
Figure 17:
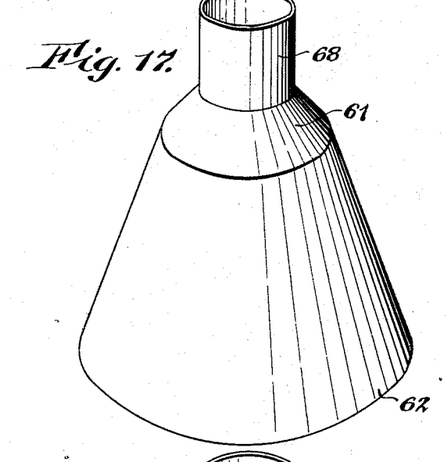
Figure 17 is a perspective view similar to Figure 12 of the modified form of section at one stage of its development.
Figure 18:
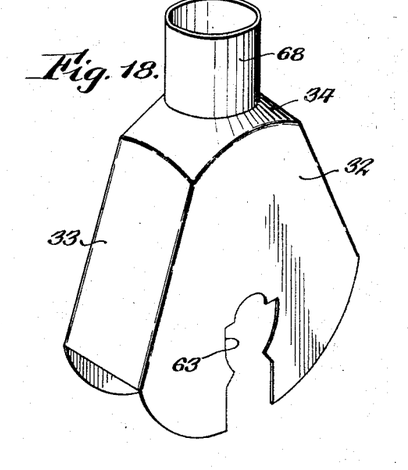
Figure 18 is a perspective view similar to Figure 13 of the section at a further stage of its development.
Figures 19, 20:
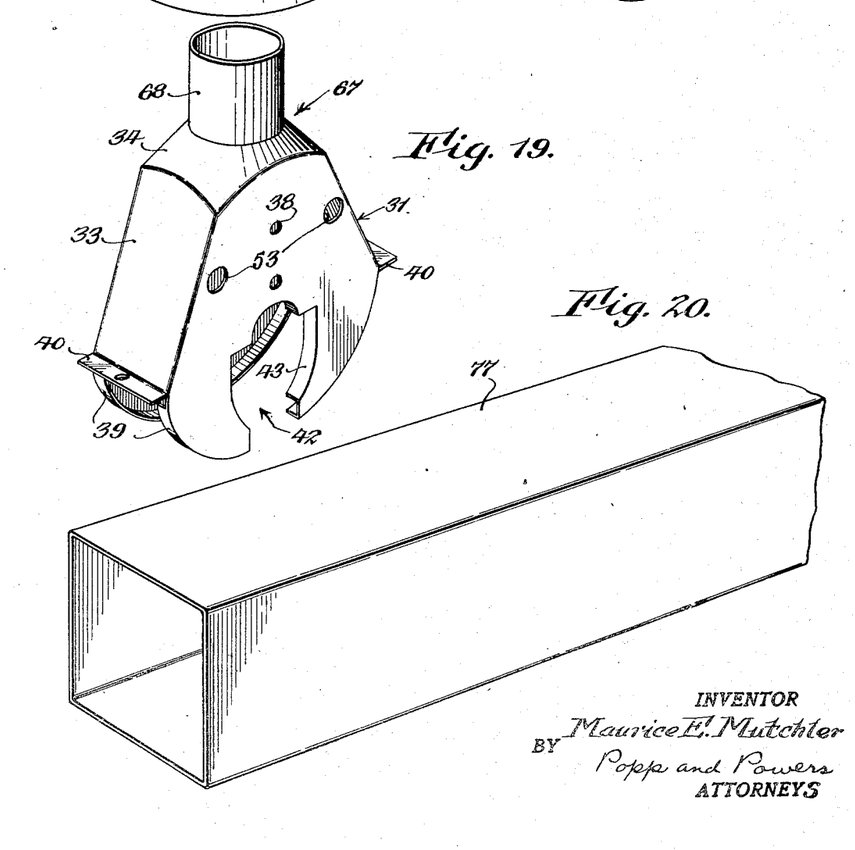
Figure 19 is a perspective view similar to Figure 14 of the section in its final form.
Figure 20 is a perspective view of a blank from which the water jacket which is employed in connection with the modified form of section may be formed.
Figure 21:
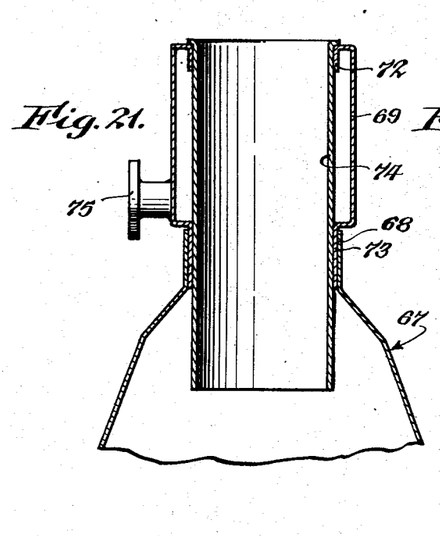
Figure 21 is a section taken along line 21—21 of Figure 16.
Figure 22:
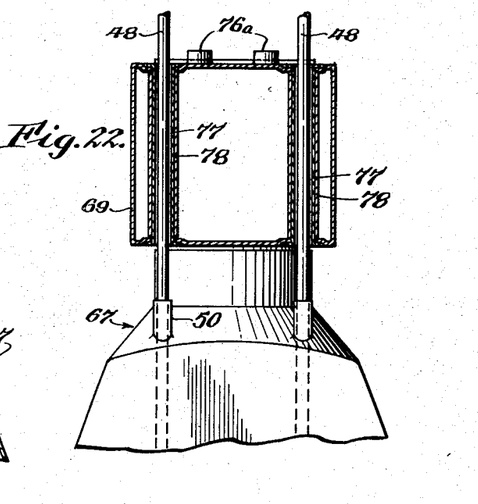
Figure 22 is a similar section taken along line 22—22 of Figure 16.
Figure 25:
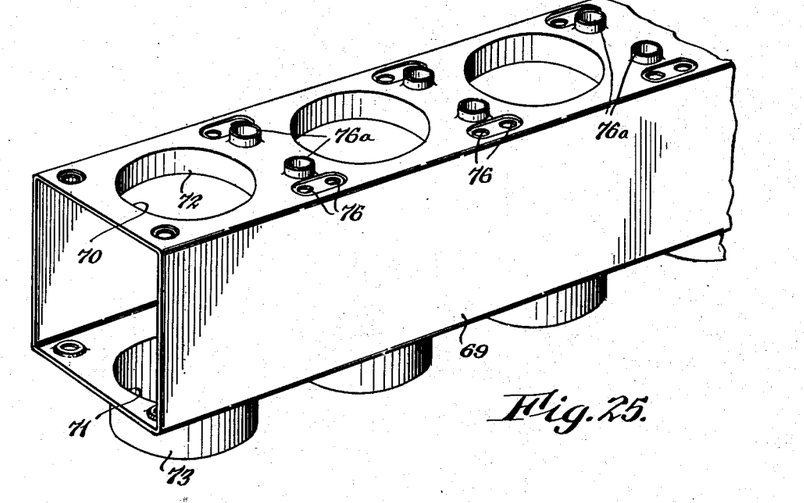
Figure 25 is a perspective view of the water jacket which is shown in Figure 21 and which may be formed from a tube of the kind shown in Figure 20.

It will be noted that in the embodiment described the annular enlargements 35 which are provided in the formation of the casing sections are for the purpose of co-operating with the cylinder wall sleeves 30a to provide passages through which a cooling medium may be circulated. Thus, each one of the sections is provided with an independent cooling chamber. In the embodiment illustrated in Figure 15, the engine includes a casing 64, a head 65 and an oil pan 66. The casing 64 is made up of a plurality of preformed sections 67 (Figure 19). Each of the said sections is formed or provided with a crank case portion 31 which is similar to the crank case portions of the section described in connection with the first embodiment and may be formed in a like manner. As distinguished from the first embodiment, however, the section 67 is formed with a relatively short neck 68. The sections 67 are assembled and secured together in the manner described and when thus assembled co-operate with the oil pan to provide the crank case of the engine. In the present embodiment the engine casing includes a single tubular water jacket 69 (Figure 25). The latter is formed with spaced pairs of aligned openings 70 and 71, parts of the tube being utilized in the formation of the openings to provide flanges 72 and 73, respectively, the former delimiting the openings 70 and the latter delimiting the openings 71. The flanges 73 fit snugly within the necks 68 of the casing sections (Figure 21). Each of the latter is completed by a sleeve 74 which is arranged in the aligned openings 70 and 71, the flanges 72 and 73 conformably engaging the sleeve and being suitably secured thereto so as to seal the cooling chamber thus provided. Water may be circulated from the pump of the engine through suitable pipe connections 75 (Figure 16) provided on the water jacket for this purpose. It will be noted that the tie rods 48 in this embodiment pass directly through the water jacket. The latter, therefore, is formed with suitable holes 76 (Figure 25) through which the said rods pass. In order to prevent leakage the rods pass through inner and outer sleeves 77 and 78 (Figure 22) which are arranged in substantially the same manner as the sleeves 26a and 26b in the head 26 of the embodiment shown in Figure 5. The sleeves 77 and 78 serve also to reinforce the water jacket. As illustrated the water jacket is formed with a plurality of flange openings 76a which are adapted to permit passage of the cooling medium from the water jacket to and from the head 65 (Figure 15) of the engine.

The water jacket 69 is preferably formed from a tube 77 (Figure 20) of rectangular cross-section, the flanges 72 and 73 which delimit the openings 70 and 71 respectively being formed in a suitable manner, after the removal of the excess metal, as by punching.

Figure 23:
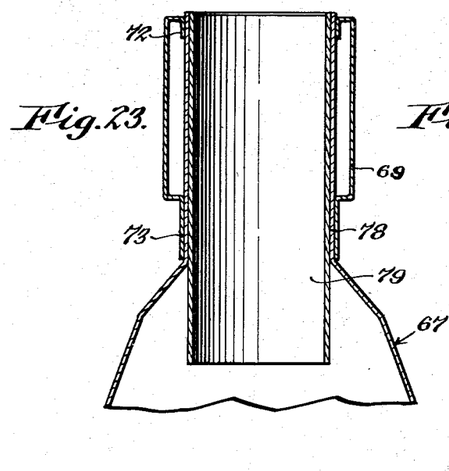
Figure 23 is a section similar to Figure 21 of a further modified construction of casing section.

In the embodiment shown in Figure 23 the neck 78 of the casing section is elongated and the flanges 72 and 73 of the water jacket are adapted to fit over the said neck and cooperate therewith to provide passages for the cooling medium. A sleeve 79 which is adapted to provide the cylinder wall of the section fits conformably within the neck 78 and is reinforced thereby throughout a substantial part of its extent.

Figure 24:
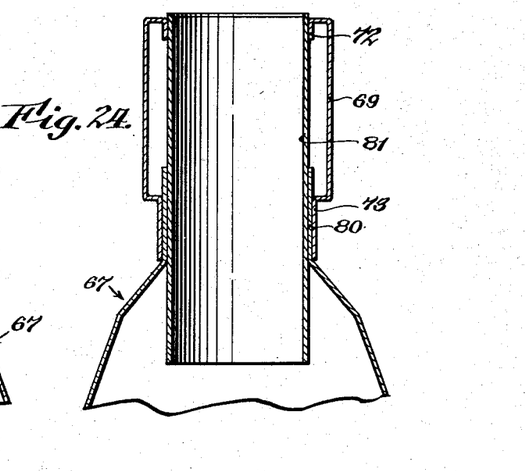
Figure 24 is a view similar to Figure 23 of another embodiment of the invention.
Figure 26:
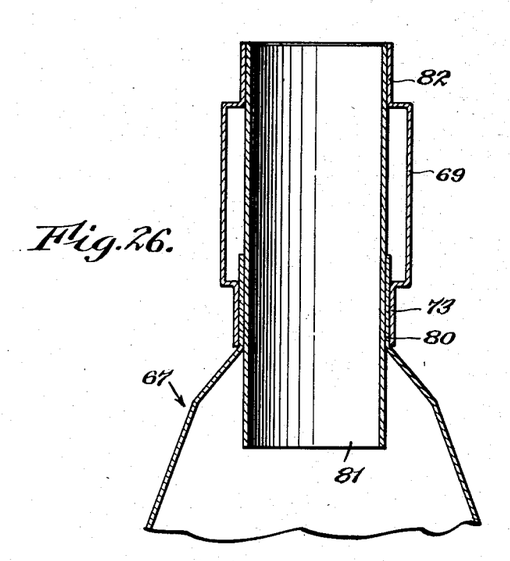
Figure 26 is a view similar to Figure 21 of a modified construction of water jacket.

In the embodiment illustrated in Figure 24 the neck 80 of the casing section is relatively short as in Figure 21. However, instead of fitting conformably about the flange 73 of the water jacket as shown in the latter figure the neck 80 fits conformably within the said flange. A sleeve 81 provides the cylinder wall of the section, the flange 72 of the water jacket fitting conformably about the upper end of the said sleeve to provide a sealed joint. In Figure 26 the flange 82 which corresponds to the flange 72 in Figure 24 is turned outwardly instead of inwardly. In other respects the construction shown in Figure 26 is substantially the same as that shown in Figure 24.

I claim as my invention:

1. An internal combustion engine including a head, a casing made of a plurality of preformed sheet metal sections, each of said sections including integral cylinder and crank case portions, said crank case portions having substantially flat sides, said sections being secured together with said flat sides in abutting relation, main bearings carried by said flat sides in which the crank shaft of the engine is adapted to be mounted and means connecting said bearings and said head for securing the latter to said casing.

2. An internal combustion engine including a head, a casing made up of a plurality of preformed sheet metal sections, each of said sections including integral cylinder and crank case portions, said crank case portions having substantially parallel sides, said sections being secured together with said parallel sides in abutting relation, main bearings carried by said parallel sides in which the crank shaft of the engine is adapted to be mounted and tie bolts connecting said bearings and said head for securing the latter upon said casing.

3. An internal combustion engine including a head, a casing made up of a plurality of sheet metal sections, each of which is formed from a tube and includes integral cylinder and crank case portions, said crank case portions being enlarged relative to said cylinder portions, means for securing said sections together so that said crank case portions are held in abutting relation, bearings carried by said crank case portions in which the crank shaft of the engine is adapted to be mounted and tie bolts connecting said bearings and said head for securing the latter upon said casing.

4. An internal combustion engine including a head, a casing made up of a plurality of sheet metal sections, each of which is formed from a tube and includes integral cylinder and crank case portions, said crank case portions being enlarged relative to said cylinder portions to provide substantially parallel side walls and connecting end walls, said side walls being secured in abutting relation and extending transversely of the crank case of the engine, bearings carried by said side walls in which the crank shaft of the engine is adapted to be mounted, tie bolts connecting said bearings and said head for securing the latter upon said casing, an oil pan and means whereby said oil pan is secured to the end walls of said crank case portions.

5. An internal combustion engine including a head, a casing made up of a plurality of connected preformed sheet metal sections, each of said sections being formed with a cylindrical portion and a skirted portion, said cylindrical portion being formed with an annular enlargement, a sleeve fitting in said cylindrical portion and adapted to provide a cylinder wall of the engine, said sleeve co-operating with said annular enlargement to provide a passage through which a cooling medium may be circulated, the skirted portions of said sections being adapted to provide the crank case of the engine and including side walls which extend transversely of the crank case, bearings carried by said side walls in which the crank shaft of the engine is adapted to be mounted and tie bolts connecting said bearings and said head for securing the latter upon said casing.

6. An internal combustion engine including a head, a casing made up of a plurality of connected preformed sheet metal sections, each of said sections being formed with a cylindrical portion and a skirted portion, a water jacket carried by the cylindrical portions of said sections, said water jacket being formed with spaced pairs of aligned openings, a sleeve arranged in each pair of said openings and adapted to provide a cylinder wall of the engine, the skirted portions of said sections being adapted to provide the crank case of the engine and including side walls which extend transversely of the crank case, bearings carried by said side walls in which the crank shaft of the engine is adapted to be mounted and tie bolts connecting said bearings and said head for securing the latter upon said casing.

7. A casing for an internal combustion engine comprising a plurality of sheet metal sections, each of which is formed from a tube, said sections being flared at one end to provide flat sides which are arranged in abutting relation, means for securing the sections together in such relation and main bearings carried by said flat sides in which the crank shaft of the engine is adapted to be mounted.

8. A casing for an internal combustion engine comprising a plurality of sheet metal sections, each of which is formed from a tube, said sections being flared at one end to provide flat sides, said flat sides being arranged in abutting relation, means for securing the sections together in such relation, main bearings carried by said flat sides in which the crank shaft of the engine is adapted to be mounted, an oil pan and means for securing said oil pan to the flared ends of said sections.

9. A casing for an internal combustion engine comprising a plurality of sheet metal sections, each of which is formed from a tube, said sections being flared at one end, said end being substantially rectangular in cross-sections, the adjacent walls of said flared ends being arranged in abutting relation, means for securing the sections together in such relation and main bearings carried by said flared ends in which the crank shaft of the engine is adapted to be mounted.

10. A casing for an internal combustion engine comprising a plurality of sheet metal sections, each of which is formed from a tube, said sections being flared at one end, said end being substantially rectangular in cross-section, the adjacent walls of said ends being secured in abutting relation, main bearings carried by said adjacent walls in which the crank shaft of the engine is adapted to be mounted, an oil pan and means for securing said oil pan to the remaining walls of said flared ends.

11. A casing for an internal combustion engine comprising a plurality of sheet metal sections, each of which is formed from a tube, said sections being flared at one end to provide abutting walls which extend transversely of the crank case of the engine and bearings carried by said walls in which the crank shaft of the engine is adapted to be mounted.

12. A casing for an internal combustion engine comprising a plurality of sheet metal sections, each of which is formed from a tube, said sections being enlarged at one end to provide parallel side walls and connecting end walls, said side walls being secured in abutting relation and bearings carried by said side walls in which the crank case of the engine is adapted to be mounted.

13. A casing for an internal combustion engine comprising a plurality of sheet metal sections, each of which is formed from a tube, said sections being enlarged at one end to provide substantially parallel side walls and connecting end walls, said side walls being secured in abutting relation, bearings carried by said side walls in which the crank shaft of the engine is adapted to be mounted, an oil pan and means whereby said oil pan is secured to the end walls of the enlarged ends of said sections.

14. A casing for an internal combustion engine comprising a plurality of connected preformed sheet metal sections, said sections being cylindrical at one end and skirted at their opposite ends to provide crank case portions, said crank case portions including side walls which extend transversely of the crank case and which are adapted to carry the bearings in which the crank shaft of the engine is mounted.

15. A casing for an internal combustion engine comprising a plurality of sheet metal sections, each of which is formed from a tube, said sections being cylindrical at one end and skirted at their opposite ends to provide crank case portions, said crank case portions including abutting walls which extend transversely of the crank case, said walls being cut away to accommodate the crank shaft of the engine and being adapted to carry the bearings in which the crank shaft is mounted.

16. A casing for an internal combustion engine comprising a plurality of sheet metal sections, each of which is formed from a tube, said sections being cylindrical at one end and flared at their opposite ends to provide crank case portions, said crank case portions including abutting walls which extend transversely of the crank case and connecting end walls which are adapted to provide the sides of the crank case, the abutting walls of said sections being cut away to accommodate the crank shaft of the engine.

17. A casing for an internal combustion engine comprising a plurality of sheet metal sections, each of which is formed from a tube, said sections being cylindrical at one end and flared at their opposite ends to provide crank case portions, said crank case portions including parallel walls which extend transversely of the crank case and tapering connecting end walls which are adapted to provide the sides of the crank case, the parallel side walls of said sections being cut away to accommodate the crank shaft of the engine and being adapted to carry the bearings in which the crank shaft is mounted.

18. A casing of an internal combustion engine comprising a plurality of connected preformed sheet metal sections, each of said sections being formed with a cylindrical portion and a skirted portion, a common tubular water jacket carried by the cylindrical portions of said sections, said water jacket being formed with spaced pairs of aligned openings, a sleeve arranged in each pair of said openings and adapted to provide a cylinder wall of the engine, the skirted portions of said sections being adapted to co-operate in providing the crank case of the engine.

19. A casing for an internal combustion engine comprising a plurality of connected preformed sheet metal sections, each of said sections being formed with a cylindrical portion and a skirted portion, a tubular water jacket carried by the cylindrical portions of said sections, said water jacket being formed with spaced pairs of aligned openings, a sleeve arranged in each pair of said openings and adapted to provide a cylinder wall of the engine, the skirted portions of said sections being adapted to provide the crank case of the engine and including side walls which extend transversely of the crank case and bearings carried by said side walls in which the crank shaft of the engine is adapted to be mounted.

20. A casing for an internal combustion engine comprising a plurality of connected preformed sheet metal sections, each of said sections being formed with a cylindrical portion and a skirted portion, said cylindrical portion being formed with an annular enlargement, a sleeve fitting in said cylindrical portion and being adapted to provide a cylinder wall of the engine, said sleeve co-operating with said annular enlargement to provide a passage through which a cooling medium may be circulated, the skirted portions of said sections being adapted to provide the crank case of the engine and including side walls which extend transversely of the crank case and bearings carried by said side walls in which the crank shaft of the engine is adapted to be mounted.

21. A casing for an internal combustion engine comprising a plurality of connected preformed sheet metal sections, each of said sections being formed with a cylindrical portion and a skirted portion, a sleeve fitting snugly in said cylindrical portion and being adapted to provide a cylinder wall of the engine, a common tubular water jacket formed with spaced pairs of aligned openings, flanges delimiting said openings, said water jacket fitting over the cylindrical portions of said sections with said flanges fitting snugly about said cylindrical portions, the skirted portions of said sections co-operating to provide the crank case of the engine and including side walls which extend transversely of the crank case and bearings carried by said side walls in which the crank shaft of the engine is adapted to be mounted.

22. A casing for an internal combustion engine comprising a plurality of connected preformed sheet metal sections, each of said sections being formed with a cylindrical portion and a skirted portion, a sleeve fitting in each of said cylindrical portions and adapted to provide a cylinder wall of the engine, a common tubular water jacket formed with spaced pairs of aligned openings in which said sleeves are arranged, the cylindrical portions of said sections fitting snugly within said openings, the skirted portions of said sections co-operating to provide the crank case of the engine and including side walls which extend transversely of the crank case and bearings carried by said side walls in which the crank shaft of the engine is adapted to be mounted.

23. A casing for an internal combustion engine comprising a plurality of connected preformed sheet metal sections, each of said sections being formed with a cylindrical portion and a skirted portion, a common tubular water jacket formed with spaced pairs of aligned openings, said openings being formed with flanges which fit snugly within the ends of said cylindrical portions, a sleeve arranged in each pair of said openings and adapted to provide a cylinder wall of the engine, the skirted portions of said sections co-operating to provide the crank case of the engine and including side walls which extend transversely of the crank case and bearings carried by said side walls in which the crank shaft of the engine is adapted to be mounted.

24. A section of the character described comprising a sheet metal shell which is cylindrical at one end and flared at its opposite end, said flared end being formed with flat side walls and tapered connecting end walls, said flat walls being adapted to carry bearings in which the crank shaft of the engine is mounted.

25. A section of the character described comprising a sheet metal shell which is cylindrical at one end and flared at its opposite end, said flared end being formed with parallel side walls and tapered connecting end walls, said side walls being cut away to accommodate the crank shaft of the engine and being adapted to carry bearings in which the crank shaft is mounted.

26. A section of the character described comprising a sheet metal shell which is cylindrical at one end and flared at its opposite end, said flared end being formed with parallel walls and tapered connecting end walls, said parallel walls being formed with openings to accommodate the crank shaft of the engine and flanges delimiting said openings, said flanges being adapted to carry bearings in which the crank shaft is mounted.

27. A casing for an internal combustion engine comprising a plurality of tubular sheet metal sections, each of said sections including integral cylinder and crank case portions and means for securing together the abutting walls of the crank case portions of said sections, whereby to connect said sections in series.

28. A casing for an internal combustion engine comprising a plurality of tubular sheet metal sections, each of said sections including integral cylinder and crank case portions, the crank case portions of said sections being enlarged with respect to the cylinder portions, means for securing together the abutting walls of the crank case portions of said sections, whereby to connect said sections in series and main bearing for the crank shaft of the engine carried by the abutting walls of said crank case portions.

MAURICE E. MUTCHLER.